United States Patent [19]

Grossi

[11] Patent Number: 4,610,378

[45] Date of Patent: Sep. 9, 1986

[54] CLOSED CONTAINER FOR FOOD POWDERS IN AUTOMATIC BEVERAGE DISTRIBUTING MACHINES

[76] Inventor: Lucio Grossi, Via Mazzini, 29, Bergamo, Italy

[21] Appl. No.: 605,491

[22] Filed: Apr. 30, 1984

[30] Foreign Application Priority Data

May 2, 1983 [IT] Italy .................. 21699/83[U]

[51] Int. Cl.⁴ .................................................. G01F 11/20
[52] U.S. Cl. .................................. 222/333; 222/411; 222/504; 222/505; 222/517
[58] Field of Search ........................... 222/231–235, 222/333, 410–413, 501, 504, 505, 510, 511, 516, 517

[56] References Cited

U.S. PATENT DOCUMENTS

| | | | |
|---|---|---|---|
| 2,885,122 | 5/1959 | Bruck | 222/231 |
| 3,473,702 | 10/1969 | Molitor | 222/413 X |
| 3,710,991 | 1/1973 | Callahan et al. | 222/413 |
| 4,458,829 | 7/1984 | Greenfield, Jr. et al. | 222/413 X |
| 4,488,664 | 12/1984 | Cleland | 222/413 X |

*Primary Examiner*—Joseph J. Rolla
*Assistant Examiner*—Michael S. Huppert
*Attorney, Agent, or Firm*—Karl F. Ross; Herbert Dubno

[57] ABSTRACT

A container for food powders, particularly for automatic beverage distributing machines, comprises a delivering and dosing member revolving inside a duct bearing a delivering mouth which is closed, in non-working conditions, by a plate closing member. The closing member is opened by the delivering and dosing member during its rotational motion.

3 Claims, 2 Drawing Figures

CLOSED CONTAINER FOR FOOD POWDERS IN AUTOMATIC BEVERAGE DISTRIBUTING MACHINES

FIELD OF THE INVENTION

The present invention relates to a closed container for food powders to be used in automatic beverage distributing machines.

BACKGROUND OF THE INVENTION

Automatic beverage e.g. distributing machines are generally equipped with containers for food powders which are provided with a delivering and dosing member consisting of an screw or a spiral or the like, which is operated by a driving motor in the machine itself.

Known distributing machines are equipped with containers having the delivering mouth, within which this delivering member is placed, always open. However, this solution presents two kinds of disadvantages: first of all, the hygiene of the powder contained is not safeguarded since the powder is exposed to the air even when the machine is not working. Furthermore, during the operation of the distributing machine, in the production of hot beverages, vapor is generated which, in the open containers, tends to form clogs in the powders contained therein, thus causing irregular dosing.

Containers have been proposed, which are provided with electromagnetically controlled closing members, but they are both complicated and delicate, making it particular difficult to disassemble the container for its periodic washing without damaging the electromagnets controlling the closing.

SUMMARY OF THE INVENTION

These and other problems are solved by the present invention, according to which there is provided a container for food powders, in particular for automatic beverage distributing machines, equipped with a revolving delivering and dosing member, which rotates inside a duct bearing the delivering mouth of the container, and which is placed in the lower part of the container itself, said delivering mouth being closed, in the non-working conditions, by a plate closing member, said closing member being opened by the delivering and dosing member during its rotational motion. The plate closing member is supported, in its lower part, by a cylindrical pin constituting the prolongation of said delivering and dosing member, the cylindrical pin passing through a hole of the plate closing member, a slot being provided in the upper part of the closing member, inside which a fixed guide pin, projecting from the wall of the container, passes.

Advantageously, in the container according to the present invention, there are provided elastic means acting, at one end, against the end of the cylindrical pin constituting the prolongation of the delivering and dosing member and, at the opposite end, against the plate closing member, keeping this latter elastically pressed against the perimeter of said delivering mouth. The delivering and dosing member is provided with a shaft connecting the member itself to a motor driving the distributing machine, the shaft being provided with coupling means having an asymmetrical outline, which assure the correctness of the position in order to mount the delivering member on the distributing machine, which position corresponds to the position in which the closing member keeps closed the delivering mouth of the container when the delivering member is not in motion.

BRIEF DESCRIPTION OF THE DRAWING

More details will become apparent from the following description of the container according to the invention, which is illustrated in the accompanying drawing, in which.

SPECIFIC DESCRIPTION

Figure 1:
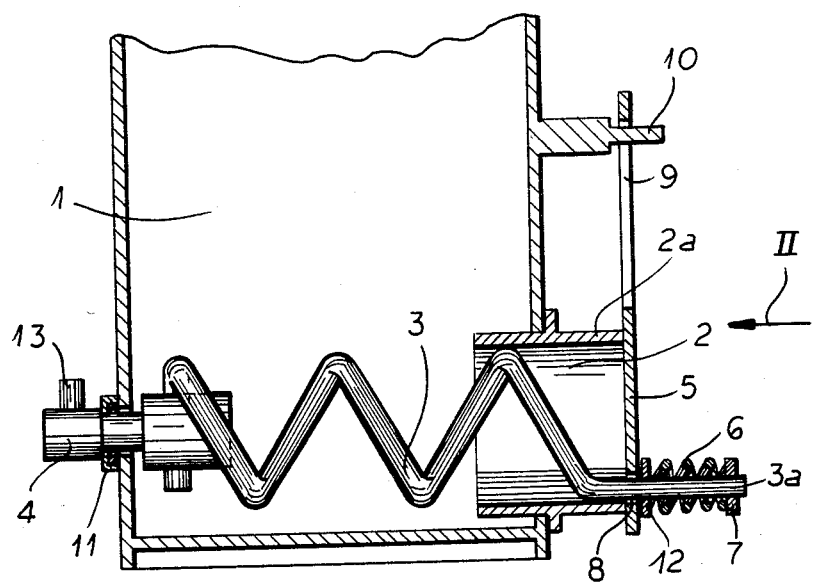
FIG. 1 is a sectional view of the container according to the invention.

As it is apparent from the Figures, a container 1 for food powders has a lower part provided with a delivering duct 2 and a delivering member 3, revolving when drives by a motor connected to the shaft 4.

The delivering member 3 is shown in the Figures in the form of a wire spirally winded, but it can also consist of an Archimedes screw or the like, according to the material to be delivered and to the dosing precision desired.

On the mouth 2a of the delivering duct 2 there is placed the closing member 5, which is kept in contact against the surface of the mouth 2a by means of a spring 6 or similar elastic member, one end of which rests against the ring 7 fixed to the cylindrical end 3a of the delivering member 3, which passes through a hole 8 made in the lower part of said closing member 5, while the other end passes against the closing member 5 itself.

Figure 2:
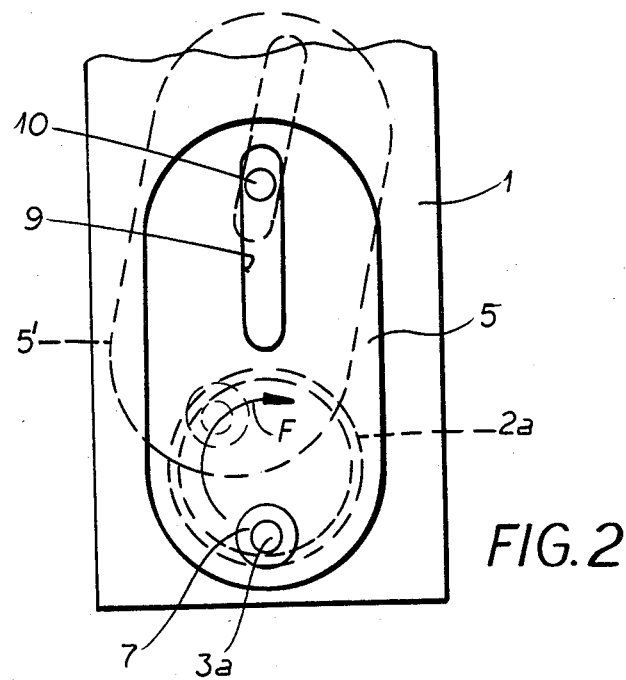
FIG. 2 is a view taken in the direction of the arrow II of FIG. 1.

The closing member 5, having the shape of a flat plate, bears in its upper part the slot 9, better shown in FIG. 2, inside which the pin 10, projecting from the front wall of the container 1, passes.

Sealing of the powder present in the container 1 is obtained by means of a packing 11 or the like, which is placed on the shaft connecting the delivering member to the motor driving the distributing machine, and of the ring 12 loaded by the spring 6 and sliding along the cylindrical end 3a of the delivering member 3.

The shaft 4 is provided with a projecting pin 13 for coupling it to the motor driving the distributing machine on which the container is to be mounted. The coupling is detachable in order to allow the removal of the container for washing.

The container operates as follows:

When the motor has not yet started, the front mouth 2a is closed by the closing member 5. When the motor operating the delivering member is set in motion, the delivering member rotates as shown by the arrow F. Accordingly, the closing member 5 is periodically lifted and opens the delivering mouth 2a, thus clearing the way for the powder, sliding over the edge of the mouth 2a itself, as the dashed lines in FIG. 2 show, with the reference 5'.

In order to stop the motor controlling the delivering, there is provided a limit switch, which is controlled by a cam or the like assuring that said stop occurs when the closing member is in the closing position. To this purpose, it is also provided that the pin 13 projects in an asymmetrical way from the shaft 4, in order to assure the correct position when mounting the container on the machine, keeping the delivering mouth 2a normally closed. The asymmetrical pin 13 is suited to be inserted in a corresponding coupling carried by the driving motor. Accordingly, only one position is allowed for the coupling of the shaft 4 with the motor and this position is chosen to place the closing member 5 in closing position against the mouth 2a when the motor is stopped. The container is therefore closed when it is not operated and which safeguards the contents against atmospheric powder, polluting agents and humidity. Sealing of the closing is assured by the pressure exerted by the spring 6 to the closing member 5 against the perimeter of the delivering mouth 2a. In order to improve the sealing, on the hole 8 there can be provided a rubber or the like packing, in particular when the container is used with powders having very small grains. Inside the container there can also be provided an agitator, not shown in the Figures, assuring the regular powder flow to the delivering member.

The container according to the invention, being devoid of electric components, can be easily removed from the distributing machine for its replacement. Furthermore, it can be completely washed with water or detergents, without suffering any damage or requiring special cares.

What is claimed is:

1. A container for food powders, in particular for automatic beverage distributing machines, comprising:
   a horizontal duct in the lower part of the container;
   a delivering mouth formed by an opening at the end of the container;
   a revolving delivering and dosing member rotatably supported inside the duct and extending through said mouth;
   a motor of the automatic beverage distributing machine to which said revolving delivering and dosing member is removably connected;
   a plate closing member supported against said mouth, said plate closing member being traversed by and positively movable from a closing position to an opening position by the delivering and dosing member during its rotational motion; and
   a cylindrical pin, the plate closing member being supported, at a lower part thereof, by the cylindrical pin which constitutes a prolongation of the delivering and dosing member, said cylindrical pin passing through a hole of the plate closing member, a slot being provided in the upper part of the closing member, inside which a fixed guide pin, projecting from the wall of the container, passes.

2. A container for food powders, in particular for automatic beverage distributing machines, comprising:
   a horizontal duct in the lower part of the container;
   a delivering mouth formed by an opening at the end of the container;
   a revolving delivering and dosing member rotatably supported inside the duct and extending through said mouth;
   a motor of the automatic beverage distributing machine to which said revolving delivering and dosing member is removably connected;
   a plate closing member supported against said mouth, said plate closing member being traversed by and positively movable from a closing position to an opening position by the delivering and dosing member during its rotational motion; and
   a cylindrical pin constituting the prolongation of the delivering and dosing member, wherein there is provided elastic means acting, at one end, against the end of said cylindrical pin and at the opposite end, against the plate closing member, keeping the latter elastically pressed against the perimeter of the delivering mouth.

3. A container for food powders, in particular for automatic beverage distributing machines, comprising:
   a horizontal duct in the lower part of the container;
   a delivering mouth formed by an opening at the end of the container;
   a revolving delivering and dosing member rotatably supported inside the duct and extending through said mouth;
   a motor of the automatic beverage distributing machine to which said revolving delivering and dosing member is removably connected; and
   a plate closing member supported against said mouth, said plate closing member being traversed by and positively movable from a closing position to an opening position by the delivering and dosing member during its rotational motion, said delivering and dosing member being provided with a shaft extending outside of the container, said shaft having a coupling means for removably coupling with corresponding coupling means of a motor driving the distributing machine, said coupling means of said shaft having an asymmetrical outline allowing only one position of said shaft for coupling with the motor, said position corresponding to the closing position of the mouth of the container by the closing member, and being conserved when the distributing machine is not in motion.

* * * * *